2,978,346

United States Patent Office
Patented Apr. 4, 1961

2,978,346

PAINT LATICES FROM SUPER BODIED OILS

Charles E. Penoyer, Burton, Ohio, assignor to The Sherwin-Williams Company, Cleveland, Ohio, a corporation of Ohio No Drawing. Filed Apr. 20, 1959, Ser. No. 807,276

2 Claims. (Cl. 106—252)

This invention relates to a paint latex emulsion constituting a super bodied drying oil as the disperse phase of an oil-in-water latex emulsion.

More particularly, this invention relates to a method of manufacture of a super bodied drying oil having a viscosity of at least 50 minutes, vacuum and heat bodied in a multiple stage operation and of such nature that an emulsion formed thereof will lay down a continuous film capable of hardening upon evaporation of the aqueous phase to form durable, solid continuous films useful in the protective and decorative coatings art, and to the method for formation of stable, oil-in-water emulsions therefrom.

In the prior art, emulsions have been formed from drying oils and drying oils modified with resins, illustratively oil modified alkyd resins, useful as the adhesive portion of emulsion paint films. More recently monomers of relatively small molecular size have been caused to polymerize together in emulsion systems to form interpolymers capable of depositing continuous films of more or less durable nature, which emulsions have been generally referred to as latices (or latexes) and because of their specific application in the protective and decorative coatings art, as paint latices. Among the first of this latter class were the so-called reverse rubber styrene-butadiene paint latices consisting of a major proportion of styrene and a minor proportion of a butadiene. These latices were referred to as "reverse rubber" latices inasmuch as the ratios of styrene monomer to butadiene monomer were in reverse ratio to the proportions used when the end result was intended to be used in massive form as synthetic rubber for ultimate end use in the manufacture of massive products, for example, rubber tires, etc. Still more recently, paint latices have been manufactured by interpolymerization of a variety of other ethylenically unsaturated monomers, illustratively homopolymers of vinyl acetate, copolymers of vinyl chloride and vinylidene chloride, terpolymers of methylmethacrylate, ethylacrylate and acrylic acid, etc.

Prior art film-forming raw materials including linseed oil have met with serious competition from the inroads of the emulsion interpolymers as illustrated above.

Oils of the type described in the specification produce emulsion paints which are especially notable for their durability and retained good appearance upon weathering exposure. Also, they dry extremely fast—far faster than conventional organic solvent reduced oil paints. This rapid setting of these paints results in the highly important avoidance of early insect and dirt collections and in a protection against the damaging, or washing away of the new film in the event of contact with rain shortly after its application. It also permits early recoating.

A very favorable characteristic of the new oil in water emulsion paint is its property of resisting alkali by virtue of its very high degree of polymerization and its low free acid content.

Further, because of this low free acid content, which may be considered unique in an oil of such high viscosity, the oil has a particularly desirable inert character with respect to certain pigments.

Also, because of the very considerable degree of polymerization the oil dries with a minimum of oxidation and there is as a consequence a reduction in the drying odor.

It is a first object of this invention to provide a paint latex emulsion of the oil-in-water class, utilizing products derived from natural drying oil seed and marine sources, and particularly linseed oil.

It is a further object of this invention to provide an oil-in-water type paint latex utilizing linseed oil and its equivalent drying oils, natural and synthetic, as the disperse phase of a paint latex system.

A further object of this invention is to provide an extremely highly polymerized linseed oil as the disperse phase of a paint latex system of such molecular weight that the disperse phase of the so-formed paint latex emulsion is sufficiently fluid in its particulate form to coalesce when deposited in thin films to form a continuous coating over substrates to which it is applied and thereafter to convert from a sol to a gel state within a reasonable time after application of the paint latex system to a substrate.

It is a still further object of this invention to provide a super bodied linseed oil product capable of being emulsified to form a stable paint latex emulsion product of such quality that it may be readily pigmented to form protective and decorative coatings of varying hue, value, chroma and specular reflection as is necessary to the desires of the paint consuming public.

It is a still further object of this invention to provide an oil-in-water emulsion of a super bodied linseed oil as a disperse phase of a paint latex, said paint latex of such durability that it may be used for exterior coating of both masonry and wooden surfaces to provide paints suitable for exterior usage and of a quality superior to the standard or conventional solvent soluble coatings such as are presently extensively used for interior and exterior surface protection.

These and other objects of the invention will become more apparent in the light of the following description, examples and claims.

It has heretofore been known that drying oils from vegetable and animal sources which are primarily triglycerides of unsaturated fatty acids containing from 16 carbon atoms upward to 32 or more carbon atoms could be subjected to heat and vacuum to produce oils having a body of the order of ten minutes without the production of, or incipient production of, gel particles which interfere with the end application and use of such oils.

Inasmuch as in this specification the language "viscosity in seconds" and "minutes" is used extensively, the term is defined as it is usually understood in the art in accordance with the following explanation. The viscosity of the oil is determined by filling a Gardner-Holdt viscosity tube having an internal diameter of 10.75 plus or minus 0.05 mm. and an internal length of 112 plus or minus 0.05 mm., leaving a small volume unfilled. The tube is corked and the tube and contents are brought to a standard temperature of 77° F. The bubble in the filled tube is allowed to come to the top of the tube with the tube in a vertical position. Concurrently with a complete inversion of the tube so that the bubble is momentarily at the base thereof, a stop watch is started and the time in minutes necessary for the bubble to traverse the length of the Gardner-Holdt tube is recorded. This time value, then, is a measure of the viscosity of the tube content and in turn is an indicative measure of the extent of the polymerization of the liquid content of the tube. Correlative methods requiring less time may be divided.

By careful manipulation, it has also been found possible to produce oils of a super bodied nature, e.g., those having a body of the order of 20 minutes and more, by subjecting the heat bodied oil to further treatment by blowing with steam (sparging). However, unfortunately, oils produced by heat and vacuum bodying and by sparging with steam having a viscosity in excess of about 10 minutes fail to provide stable emulsions and therefore the necessary quality to compete with and meet with the physical results obtained with paint latex systems formed from the simpler monomers as discussed above. In order to provide the quick setting characteristics of the polymerized vinyl type latex, it has been found necessary to use oils of at least about 50 min. viscosity. Production of oils of 50 min. viscosity under techniques presently available fail to produce a heat bodied oil, free from gel particles, and yet which may be utilized to form emulsions stable with time and capable of being pigmented without coalescence of the emulsion system.

It has been found that if the linseed oil is vacuum and heat bodied in a particular multi-step fashion, then it becomes feasible to produce an oil having a viscosity of at least 50 minutes, free from gel particles, yet capable of being emulsified in accordance with and to meet the requirements of the protective and decorative coatings art.

In order to provide the basic super bodied oil to accomplish the objects of this invention, it has been found that an alkali refined linseed oil can be heat bodied during a first stage under conditions of heat and vacuum of slightly more severe nature in the presence of from about 3% to 5% by weight of the raw oil of a drying oil fatty acid partial ester of pentaerythritol.

In the original production of super bodied oils essential to the ends of this invention, the drying oil fatty acid partial ester of pentaerythritol is formed in a separate operation and a specific illustration of the formation of this ester will be found in the examples. Referring to the product generally and the limitations inherent in its successful use in the method and in the products of this invention, it is preferred to use approximately one mol of fatty acid per mol of pentaerythritol to form the partial ester.

However, it is also possible to increase the molar ratio of drying oil fatty acid to pentaerythritol appreciably above the mol-to-mol ratio without destroying the efficacy of the additive. From a series of experiments it appears that the additive is effective so long as at least one of the hydroxyl groups of the pentaerythritol molecule are unesterified. However, it is preferable that at least two of the hydroxyls be unesterified and it is recommended practice that only one of the hydroxyls thereof be esterified with the fatty acid in the method of heat bodying now being described. The product is herein referred to as a drying oil fatty acid partial ester of pentaerythritol.

In a first stage in the manufacture of the super bodied oil, essential to the ends of this invention, from 3 to 5% by weight of the oil of the partial fatty acid ester of pentaerythritol is added and the admixture of oil and partial ester heated under a vacuum of at least about 26 inches of mercury and a temperature above about 525° but less than 580° F. to heat body the drying oil. It is necessary as the oil begins to exceed several seconds in viscosity to introduce steam into the oil during the operation to aid in the discharge of products of thermal decomposition, including any uncombined fatty acids and ester and to prevent some molecules from cross-linking to a point where gelation and gel particles commence to form, or are incipient, in the treated oil. During the first stage of the vacuum and heat bodying of the linseed oil-partial ester of pentaerythritol containing mixture, vacuum, temperature and steam sparging are maintained until the viscosity of the oil is greater than about 28 seconds but not above about 30 seconds. This first stage of polymerization is at a relatively slow rate but as the oil increases in viscosity above about 25 seconds, the rate of bodying increases disproportionately to the time and it then becomes necessary to reduce the temperature to the order of about 550° F. The vacuum may at this time then be reduced to substantially atmospheric but preferably slightly less than atmospheric, of the order of 2-3 in. of water. A slight vacuum is desired in order that the more volatile components that may be formed due to decomposition are removed. The oil is further bodied under these conditions to a viscosity of about ten minutes. The temperature is dropped in increments to control polymerization rate to a viscosity of at least 50 minutes but not greater than about 75 minutes and preferably a top value of 60 minutes. While it is possible to produce bodied oils of the order of 75 minutes viscosity in laboratory procedures and in laboratory quantities, with larger quantities of bodied oil as are used in commercial production it has been found almost mandatory to limit the viscosity of the bodied oil to less than 75 minutes and preferably not more than about 60 minutes.

After the oil has been heat bodied to within the described limits of viscosity, the temperature of the oil is reduced to approximately 300° F., and the oil solids constituting the super-bodied oil are thinned with a minor amount of a blend of voltaile organic solvents. Of the organic solvent used to reduce the oil, a minor proportion of the order of 1 to 4% (by weight of the oil) of the solvent is an alcohol containing from 1–3 carbon atoms which has been oxyalkylated. The oxyalkylating reactant is most ordinarily ethylene oxide, although propylene oxide is also operable for the purposes of this invention. The two most commonly used oxyalkylated alcohols are diethylene glycol monomethyl ether and ethylene glycol monoethyl ether. Ethylene glycol monoethyl ether acetate is not suitable for the purposes of this invention, as it is known to contribute to emulsion instability. The oxyalkylated alcohol solvent has been found necessary in order to prevent the super bodied oil from continuing to polymerize, in situ, in the final product.

In major proportion and a part of the solvent is a usual paint thinner which may be selected from the class of aromatic and aliphatic hydrocarbon solvents standardly used in the protective and decorative coatings art. Paint and varnish makers naphtha, referred to us as VM&P naphtha, is suitable but not particularly unique for this purpose.

The super bodied oils should not be reduced in solids content to less than about 80%, inasmuch as further reduction of the oil content by the inclusion of volatile solvents is detrimental to the freedom of the ultimate paint formulator in obtaining the necessary amount of binder solids to give durable films. It is preferred to keep the solids content of the solvent-reduced super bodied oil to at least about 85% non-volatile by weight.

In the emulsification of prior art drying oils and varnishes, no particular difficulty has been experienced in the selection of emulsifying agents to accomplish this end. However, in the case of super bodied oils having a viscosity in excess of about 50–60 minutes, the selection of an emulsifying agent has been most difficult, as the standard surfactants normally useful for this purpose including the alkali metal salts and the amine soaps of fatty acids, mahogany oil sulphonates and the usual run of anionic and cationic agents have not been successful in producing an emulsion useful as a paint latex from the super bodied oils described above.

The non-ionic emulsifying agents as a class and in and of themselves also are inoperable for the purposes of producing a paint latex utilizing the super bodied oils of this invention as the disperse phase.

After considerable investigation it was found that the alkali metal salts of polymeric fatty acids containing principally the dimers and trimers of drying oil fatty acids were successful in producing the requisite emulsion stability, but only when used in conjunction again with certain non-ionic oxyalkylated emulsifying agents whose composition can be identified by a new method of definition which may be referred to as the hydrophile, lipophile balance or the hydrophilic number of a particular chemical class of emulsifying agent.

For those who wish to review the subject of this physical quality and for purposes of illustration and clarification, the following articles are included herein by reference the same as though they were set forth herein in their entirety.

(1) "Classification of Surface Active Agents," volume 1, No. 5, December 1949, and (2) "Calculation of HLB Values of Non-Ionic Surfactants," volume 5, No. 4, December 1954.

These first two articles are found in issues of the Journal of the Society of Cosmetic Chemists in articles by Wm. C. Griffin.

(3) "Clues to Surfactant Selection Offered by the HLB System," Official Digest of the Federation of Paint and Varnish Production Clubs, June 1956, by the same author.

(4) The commercial booklet entitled "Igepals," published by Antara Chemicals, 435 Hudson Street, New York 14, N.Y., in March 1954.

Briefly stated the HLB or HN value is "an expression of the relative simultaneous attraction of an emulsifier for water and for oil (or for the two phases of a system to be emulsified) . . . For purposes of convenience the effective balance of these two groups is assigned a numerical value." Under the HLB system of nomenclature those surfactants most lipophilic (or attracted to oil) are given low numbers and those attracted strongly to water are assigned progressively high numbers. The numerical values range from one to forty with 10 being a practical midpoint of the range. Another group, concerned with non-ionic surfactants have adopted the term hydrophilic number, or HN to the concept. The HN value in early work was determined to be equivalent to the weight percentage of ethylene oxide groups in the total non-ionic molecule. This has been established only for non-ionic agents having an alkyl phenol nucleus. Thus, non-ionic surface active agents having an alkyl substituted phenol nucleus with an HN of 50 (HLB of 10) has 50% of ethylene oxide groups by weight in the total molecular weight of the surfactant.

Further experience with assignment of numerical physical constants to emulsifiers has established that these values are not limited to ethylene oxide containing surfactants, nor to any particular chemical class of emulsifiers but can be assigned to anionic surfactants as well. For example, the well-known sodium salt of dioctyl ester of sulfosuccinic acid (Aerosol "OT") has been demonstrated to have a very high hydrophilic number. Part of the higher values attributed to this class is believed due to their ionic nature. Indications are that the cationic agents are also of very high HN.

In reference to non-ionic emulsifying agents, the hydrophilic number can be correlated with the hydrophile lipohile balance in accordance with the equation $$5 \times HLB = HN$$

In the present case, the non-ionic emulsifying agents useful for the purposes of the invention alone or in blends must have a HN number between 39 and 43 to be operable. It is also interesting to note that of the anionic class of emulsifying agents, only the alkali metal salts of the polymerized fatty acids are useful. Definitely inferior results for the purposes of this invention are obtained when one uses an ammonia or amine salt of these same acids for the purposes of this invention.

In general, it has been found necessary to utilize from about 1% to 5% by weight of the reduced oil of a blend of non-ionic emulsifying agent having an HN (of the blend) between 39 and 43 and between 5–10% by weight of said oil of an alkali metal salt of a polymerized drying oil fatty acid containing principally dimers and trimers thereof.

Use of other protective colloids (if one classifies soaps as a protective colloid) is not essential to the objects of this invention and in some instances they have been detrimental while in others they have proved to be of advantage. Of the class of protective colloids standardly use in emulsion paint technology, sodium, potassium and ammonium polyacrylates have generally been indicated to be the most useful of the protective colloids as a class. The alginates and hydroxy ethylcellulose have also from time to time shown promise depending upon the pigmentation and other factors present in the formulation of a final paint emulsion paint product.

In forming the emulsion of the highly bodied oils, it has been found extremely difficult to include the necessary quantities of driers to promote the catalytic oxidation of the finally deposited film by initial inclusion of the drier in the oil immediately subsequent to the manufacture. As it is convenient and practically necessary to heat the super bodied oil prior to emulsification to obtain the ultimate fine particle size of the super bodied oil as a disperse phase in the continuous aqueous phase, it has been found most practical to withhold the driers (lead and cobalt soaps) and add these to the hot oil immediately prior to emulsifying the heated oil under a high shearing stress by its slow addition to the aqueous phase. The aqueous phase at the time of addition of the oil contains the non-ionic emulsifying agent as well as the alkali metal salt of the polymeric fatty acids and a small amount of trisodium phosphate in order to provide the aqueous phase with the essential pH range for optimum emulsion stability.

The emulsion is preferably formed by weighing out a substantial portion of the aqueous phase in a Werner-Pfleiderer or other type of sigmoid dough mixer. The super bodied oil phase is heated to above 150° but to less than the boiling point of water. The requisite amount of lead and cobalt driers is added to the oil just prior to the slow addition of the heated, drier containing oil to the aqueous phase while the aqueous phase is subjected to high shearing stresses. In order to prevent gelation of the oil phase while heated to the temperature indicated, the whole hot oil mass and mixer volume is kept under a blanket of inert gas, preferably nitrogen. The inert gas aids in preventing the oxygen of the air from gelling the surface of the hot oil as it is fed into the aqueous continuous phase.

The ratio of oil phase to water phase is not particularly critical on its lower end. In other words, stable emulsions can be made at 5, 10, 20 or 40% solids content but at this low level of non-volatile binder in the paint latex emulsion, its field of usefulness in the final paint latex product is seriously curtailed. In other words, it is desirable in the manufacture of a paint latex to hold the solids content, or the non-volatile content, of the completed paint latex emulsion at as high a level as is practical without introducing emulsion reversion and instability problems.

In the composition as described above, solids contents of as high as 60% in paint latices have been produced and have retained their stability during extensive shipping and storage tests. High concentration of disperse phase solids in the paint latex emulsion provide the ultimate paint formulator with greater latitude in the formulation of pigmented goods. It is well known in the art of emulsion paint manufacture to disperse the pigment initially in water prior to its inclusion in the emulsion system. Thus when one wishes to limit the total water content in the paint to a minimum, the higher the concentration of disperse phase binder solids in the paint latex, the more useful the paint latex product becomes for emulsion paint manufacturing purposes.

After emulsification of the super bodied oil, it is also contemplated that the emulsion product be subjected to air blowing. In certain instances this provides a means for speeding the drying time of the coalesced film after deposition of the emulsion paint on a suitable substrate. As the problem of gelation of oils of super bodied character is constantly present, it is desirable to take all precautions in the handling of the oil up until such time as the oil phase has become dispersed in microscopic form in the aqueous continuous phase of the paint latex emulsion. The use of the partial ester of pentaerythritol in the manufacture of the heat bodied oil appears essential in order to maintain the low acid values in the final super bodied oil essential to emulsion stability. It may be unnecessary to mention that the body or viscosity of the disperse oil phase of the paint latex emulsion of this invention must not be advanced to a point where the essential liquidity of the disperse phase is lost to gelation, or to a point where formation of solid particles begins to occur. Liquidity of the disperse phase is essential to the coalescence of the particles subsequent to application of the paint latex in order to obtain continuous films.

In the manufacture of the basic polymeric super bodied oil, yields of the order of 97–98% are obtained during the first stage of operation and of the order of 96% in the second stage, giving an overall yield of the product of 93%. This is pointed out to distinguish over certain prior art vacuum and heat bodied oils where the yields are of the order of 80% and less.

It is well known and understood in the art that drying oils from a variety of sources can be employed in the practice of this invention and that various drying oil fatty acids can be employed for esterification with glycerine and other polyhydric alcohols to produce drying fatty acid neutral esters having sufficient reactivity and equivalence to linseed oil for the purposes of this invention. Linseed oil is preferred, however, in the practice of this invention.

The following examples, while not exhaustive, illustrate the best method of practicing the invention. It will be clear, however, to those skilled in the art that certain variations in processing conditions and nature of the components may be changed without materially interfering with the practice of the invention. It is suggested, however, that minor variations be studied on a small scale before entering into large scale commercial adaptation of the changes.

EXAMPLE 1

*Preparation of partial pentaerythritol esters*

3,055 lbs. of a distilled drying oil fatty acid having an iodine value between 140 and 170 and an acid number of about 170 were heated in a varnish kettle to the temperature of about 350° F. This temperature was held for approximately 15 minutes to thoroughly dry the acids. The temperature of the oil was then elevated to 475° F., at which time 7 lbs. of calcium hydroxide pasted in a small proportion of the oil were added. 100 pounds of pentaerythritol were added over the next hour. Over the next two hours, 400 pounds of pentaerythritol were added. During an additional 1½ hours, 518 pounds more of pentaerythritol were incorporated in the hot oil. The reactants were added for this period at a temperature of 475° F. The indicated esterification temperature was maintained for an additional 1½ hours, after which the temperature of the partial fatty acid ester of pentaerythritol was reduced to 300° F. and the product pumped to storage.

The partial ester of pentaerythritol product had an acid value less than 7, a color of 16 maximum (Gardner scale) and a viscosity of from 10–18 seconds (Gardner-Holdt tube at 77° F.).

EXAMPLE 2

*Preparation of the dispersed phase oil*

15,350 lbs. of alkali refined linseed oil and 650 lbs. of the partial ester of pentaerythritol prepared in accordance with Example 1 are measured into a reaction vessel fitted with a condenser, thermometer, agitator, steam source and a vacuum source. The steam line is fitted into the bottom of the vessel. A vacuum of from 26–28 inches of mercury is drawn over the content of the reaction vessel and the temperature raised to about 565° F. Steam is admitted through the bottom of the vessel and through the hot oil (sparging). After about 2½ hours, a sample of the material is withdrawn for a viscosity determination. When the sample is found to have a 28 second viscosity (after approximately 3 hours at the bodying temperature of 565° F.) (viscosity as herein referred to in seconds and minutes refers to the time necessary for a bubble to travel the length of a Gardner-Holdt viscosity tube when the oil content thereof is at a temperature of 77° F. and the tube is completely inverted in accordance with standard practice in the art), the temperature is reduced to the order of about 550° F. and the vacuum over the content of the vessel reduced to approximately 3 inches of water.

Under these conditions, heat bodying of the oil is continued to approximately a 10 minute viscosity. The temperature is again reduced to approximately 525° F. and the batch is held for a viscosity of 30 minutes. The temperature is reduced at a rate such that at 350° F. the viscosity of the oil has become about 54 minutes. The oil after cooling to 250° F. will have picked up to about 55 minutes. The so bodied oil is reduced with solvents which solvent addition and lowered temperature arrests substantially, the further bodying of the oil.

The products of this invention have been found to be operable and to give good results so long as the viscosity of the oil produced in the manner described is of the order of 50–60 minutes. At 75 minutes the oils can be used under laboratory conditions but trouble eventuates in large scale commercial production. In the latter case, oils above 60 minutes viscosity tend to develop gel structures which interfere with the production of commercially acceptable emulsion products for the purposes of this invention. At viscosities below about 50 minutes, the final paint latex emulsions produced in accordance with this invention fail to develop film properties having the requisite durability essential to the ends of this invention.

The vacuum bodying of the oil to about a 28 second level as is carried on in the initial stages of the oil bodying occurs at a relatively slow rate. Subsequently thereto, however, the bodying rate changes quite rapidly and in order to provide the essential control and to obtain the qualities desired in the disperse phase of the product here described, it has been found necessary to reduce the temperature of bodying and to reduce the vacuum to substantially atmospheric. A very slight vacuum is preferred to be maintained in order to prevent condensation of unwanted distillates back into the batch itself. The volatile components escaping from the treated oil during bodying are recovered in a side arm trap or condenser and these recovered condensed acids may be re-used in the preparation of the partial pentaerythritol ester product of Example 1, it being necessary to use commercial sources of distilled fatty acids in initial production.

After reaching the final viscosity of 50–75 minutes and preferably 50–60 minutes range, the oil is cooled to about 250° F. and thinned to not less than 80% solids and preferably to about 90% solids, with a blend of volatile organic solvents comprising a minor amount of an alcohol containing from 1–3 carbon atoms which has been oxyalkylated and a major amount of a volatile aliphatic or aromatic hydrocarbon, for example, VM&P naphtha. We prefer to use about 3% of diethylene glycol monomethyl ether or ethylene glycol monoethyl ether and about 7% hydrocarbon thinner by weight of the super bodied oil. Alcohols containing less than 3 carbon atoms which have been oxyalkylated with ethylene or propylene oxide are most useful for the purposes of the invention. The latter compounds prevent the after-bodying of the disperse oil phase when in its final emulsified form and when so stored as a paint latex system. Driers are avoided at this time of manufacture as they tend to promote gel structures within the bodied oil during subsequent stages of manufacture of products of this invention. Incorporation of the driers in the paint latex emulsion product require somewhat special techniques in order to avoid premature gelation of the highly bodied basic oil. That the manufacture and composition of the super bodied oil is critical is apparent from the fact that super bodied oils made in accordance with U.S. Pat. 2,607,784 are not operable for the purposes of this invention.

While it is preferred to employ oils as manufactured above without incorporation of resinous components, some success has been obtained by the incorporation of oil soluble resinous bodies prior to the bodying process as described or in early stages of heat bodying of the oil. Not more than 25% of oil-soluble resinous products should be employed in any case and it is preferable to be kept below this figure. At the 25% level and above, emulsion stability problems become extremely acute. One particularly useful additive resinous product is an epoxy stabilized chlorinated rubber which, while slowing the drying of the final product slightly, promotes toughness and early water resistance of resultant films deposited from the final super bodied drying oil containing latex emulsion product.

Water soluble solvents, such as ethylene glycol monoethyl ether acetate and other similar highly ionized water and oil soluble solvents are also to be avoided inasmuch as they appear to contribute to emulsion instability problems.

The emulsifying agent

Strangely, the super bodied oil described above provides a difficult problem of emulsification and most of the commonly used emulsifying agents of the prior art for producing aqueous dispersions of oils are unsuitable. Non-ionic emulsifying agents alone were not suited to produce sufficient emulsion stability. Test runs of a series of synthetic detergent type, including the mono soaps of various saturated and unsaturated acids, were all unsuited for the purposes of this invention. Blends of the alkali metal soaps of the various saturated and unsaturated acids in conjunction with non-ionic agents were also found unsuited to produce the necessary emulsification stability. After considerable investigation, it was found that the alkali metal soaps of polymerized fatty acids gave some promise but in and of themselves were insufficient. It was found necessary to use blends of the alkali metal salts of polymerized fatty acids containing principally dimers and trimers. Polymerized fatty acids are well known in the art and are commercial products available from a variety of sources. Most often these are prepared by pressure polymerizing unsaturated fatty acids containing from about 18 to 24 carbon atoms. The unsaturated fatty acids are available from vegetable as well as marine origin. While it is usual in emulsion technology to find relatively little difference between the use of ammonium, morpholine and other amine soaps as compared with the alkali metal soaps, in this instance only the alkali metal soaps seem to be useful. When used in conjunction with a particular class of non-ionic agents of the oxyalkylated class having hydrophilic numbers between 39 and 43, and in a particular ratio to the disperse oil phase, stable emulsions may be prepared even without protective colloids which emulsions may be pigmented without phase instability problems developing.

While satisfactory results are obtainable without use of protective colloids, it is sometimes found desirable to use agents of this class and of these certain of the sodium polyacrylates have given the greatest promise in the overall formulation of paints from the paint latex systems herein described.

EXAMPLE 3

Manufacture of the emulsion

An aqueous solution is prepared containing from 1 to 5% by weight of the reduced oil to be added to the aqueous phase of a non-ionic emulsifying agent having an HN between 39 and 43. In this specific example, 1.5% of polyoxyethylene sorbitan trioleate having an HN number of 55, 1% of sorbitan monolaurate having an HN number of 43 and ½% of sorbitan trioleate having an HN number of 9 were dissolved in the aqueous phase, along with a polymerized fatty acid containing 85% dimer content and 12% trimer content, completely neutralized with potassium hydroxide. It is convenient to prepare the potassium salt of the dimer acid soap in a separate aqueous medium containing approximately 50% solids and to blend this aqueous solution with the aqueous phase in advance preparatory to emulsification of the super bodied oil manufactured as described above.

400 parts of water containing 128 parts of the potassium salt of the dimer soap, 4.8 parts of trisodium phosphate and 48 parts of the blend of non-ionic emulsifiers described above is weighed into a Werner-Pfleiderer mixer. The aqueous phase is agitated by energizing the sigmoid blades. 1600 parts of oil, solvent reduced as described above, are heated to 200° F. Somewhat more than the conventional amounts of cobalt and lead naphthenate driers based on the oil content are weighed out and blended with the hot oil just before or during its addition in a small stream by slow addition under an inert atmosphere to the aqueous phase in the Werner-Pfleiderer mixer. Addition of the oil and drier is continued with the agitation to produce a final concentration of disperse phase of the order of about 60%. The concentration of the solids may be varied between 40 and 60%. It is preferred to keep the concentration of the dispersed oil phase in the resultant emulsion product at a relatively high level. This is for the reason that in pigmenting the final emulsion, is is customary to disperse the various pigments used in the manufacture of the paint in water prior to incorporating them in the paint latex emulsion. Thus it is desirable to withhold as much water as is conveniently possible from the paint latex emulsion in order that the paint formulator may have greater freedom in the incorporation of the pigmentary components in the paint latex and in formulation of the ultimate paint products. After about 1600 parts by weight of oil phase have been dispersed in the aqueous continuous phase to a particle size averaging between ½ to 1 micron, the latex product is completed and may be removed from the dough type mixer to drums for storage, shipment, or immediate use in subsequent paint manufacturing steps.

As the manufacture of paints from paint latices are now old in the art, it is deemed unnecessary to describe the manufacture of a completed paint from the paint latex made as described above. As is well known in the art, a wide variety of components may be incorporated with the paint latex in order to obtain many of the properties essential to a completed paint. These include preservatives, protective colloids, coupling agents, etc., and as this field is an art in itself and not a part of the present invention, the subject need not be further considered here.

In the example above, the amount of trisodium phosphate produced a pH in the final emulsion of about 8.6. If in the practice of this invention the pH is less than 8 or greater than about 9, appropriate adjustment in the amount of trisodium phosphate included in the aqueous phase should be made so as to adjust the pH within this range. From a large number of manufacturing experiences, it has been usually found that the amount of trisodium phosphate described in the example needs little adjustment in order to bring the pH within the range described. The emulsion product made in accordance with the above example, even at 60% solids concentration, has been found to be quite stable after extensive shipping and storage tests. Pigmentation may be achieved without use of protective colloids although it is preferable in certain instances to use potassium polyacrylate ("Hecryl A-1000," Union Bay State Chemical Co.), to assist in trouble-free pigmentation, increasing emulsion stability and improvement of wet edge during brush application of the resultant paint.

It is obvious that other non-ionic emulsifying agents than those indicated may be used so long as the HN number of the paint lies within the range of 39 to 43. The non-ionic emulsifier is operable within the range of from 1 to about 5% by weight of the reduced oil, more than this being superfluous and less than this unsatisfactory from a commercial viewpoint. The amount of the alkali metal salt of the polymerized drying oil fatty acid emulsifier essential to emulsion stability may lie within the range of from 5 to 15% by weight of the oil but is preferably held within a 6–10% range.

In the manufacture of the emulsion, the oil is heated to above 150° but less than the boiling point of water in order to increase the fluidity of the oil and assist in dispersing the heavy viscosity oil in the relatively non-viscous water phase.

It is important to keep the non-volatile solids content of the bodied oil as high as possible in order that the ultimate solids content of the paint latex resulting from emulsification be provided with a maximum flexibility in paint formulation.

Having thus described my invention, I claim:

1. A method of manufacture of an oil-in-water emulsion which comprises heat bodying an alkali refined linseed oil in the presence of 3 to 5% by weight of said oil of a drying oil fatty acid partial ester of pentaerythritol under a vacuum of at least about 26 inches of mercury and a temperature above about 525° but less than 580° F. while sparging the oil with steam to a viscosity of greater than 25 seconds but not above about 30 seconds; thereafter reducing the temperature to about 550° F. and increasing the pressure but to less than atmospheric pressure, further bodying the oil under the stated process conditions to a viscosity greater than 10 minutes, meanwhile continuing to lower the temperature until at 250° F. the viscosity is greater than 50 minutes but less than 75 minutes, thinning the so-bodied oil with a volatile organic solvent comprising a minor amount of a mono alcohol containing 1 to 3 carbon atoms which has been oxyalkylated and a major amount of a volatile hydrocarbon solvent to a solids content of not less than about 80%, emulsifying said oil under high shearing stress by its slow addition at a temperature above 150° but less than about 212° F. to an aqueous solution containing from 1 to 5% by weight of the reduced oil of a non-ionic emulsifying agent having an HN between 39 and 43 and 6 to 10% by weight of said oil of an alkali metal salt of a polymerized drying oil fatty acid containing principally dimers and trimers thereof, said aqueous solution having a pH between 8.0 and 9.5 so adjusted by addition thereto of alkali metal phosphate and containing such total heat bodied oil addition that the non-volatile solids content of the emulsion lies between 40 and 60%.

2. An oil-in-water emulsion which comprises a vacuum and heat bodied linseed oil, free from gel particles having a viscosity of greater than 50 minutes but less than 75 minutes, said bodied oil reduced with a volatile organic solvent comprising a minor amount of an oxyalkylated monoalcohol, said monoalcohol containing from 1 to 3 carbon atoms and a major amount of a volatile hydrocarbon solvent to not less than 80% non-volatile content as the disperse phase and a continuous aqueous phase comprising water, from 1 to 5% by weight of the disperse phase of a non-ionic emulsifying agent having an HN between 39 and 43 and 6 to 10% by weight of said oil of an alkali metal salt of a polymerized drying oil fatty acid containing principally dimers and trimers thereof, said emulsion containing an alkali metal phosphate in a quantity sufficient to impose a pH of between 8.0 and 9.5 and the quantity of the disperse oil phase of the order of 40 to 60% by weight of the total product.

References Cited in the file of this patent

UNITED STATES PATENTS

| | | |
|---|---|---|
| 2,382,533 | Auer | Aug. 14, 1945 |
| 2,391,041 | Stamberger | Dec. 18, 1945 |
| 2,530,370 | Auer | Nov. 21, 1950 |

OTHER REFERENCES

Atlas Surface Active Agents, Atlas Powder Co., Wilmington, Del., 1948, page 38.